(12) United States Patent
Kools (10) Patent No.: US 7,770,739 B2
(45) Date of Patent: *Aug. 10, 2010

(54) METHOD OF MANUFACTURING MEMBRANES AND THE RESULTING MEMBRANES

(75) Inventor: Willem Kools, Reading, MA (US)

(73) Assignee: Millipore Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/386,115

(22) Filed: Apr. 14, 2009

(65) Prior Publication Data

US 2009/0252948 A1    Oct. 8, 2009

Related U.S. Application Data

(62) Division of application No. 11/177,718, filed on Jul. 8, 2005, now Pat. No. 7,560,025, which is a division of application No. 10/275,129, filed as application No. PCT/US01/16811 on May 22, 2001, now Pat. No. 6,994,811.

(60) Provisional application No. 60/206,622, filed on May 24, 2000.

(51) Int. Cl.
*B01D 39/00* (2006.01)
*B01D 39/14* (2006.01)
(52) U.S. Cl. .......................... 210/500.38; 210/500.22; 210/500.27
(58) Field of Classification Search ............ 210/500.27, 210/500.38, 500.37, 500.23; 264/41, 171.23, 264/171.12

See application file for complete search history.

(56) References Cited

U.S. PATENT DOCUMENTS

| | | | |
|---|---|---|---|
| 4,208,848 A | 6/1980 | Kohl | |
| 4,247,498 A * | 1/1981 | Castro | ......................... 264/41 |
| 4,340,479 A | 7/1982 | Pall | |
| 4,384,047 A | 5/1983 | Benzinger et al. | |
| 4,629,563 A | 12/1986 | Wrasidlo | |
| 4,666,607 A | 5/1987 | Josefiak et al. | |
| 4,933,081 A | 6/1990 | Sasaki et al. | |
| 5,013,339 A | 5/1991 | Mahoney et al. | |
| 5,145,583 A | 9/1992 | Angleraud et al. | |
| 5,444,097 A | 8/1995 | Tkacik | |
| 5,489,406 A | 2/1996 | Beck et al. | |
| 5,498,335 A * | 3/1996 | Moya | ......................... 210/490 |
| 5,514,461 A | 5/1996 | Meguro et al. | |
| 5,626,805 A | 5/1997 | Maguro et al. | |
| 5,683,584 A | 11/1997 | Wenthold et al. | |
| 5,834,107 A | 11/1998 | Wange et al. | |
| 6,013,688 A | 1/2000 | Pacheco et al. | |

(Continued)

*Primary Examiner*—Ana M Fortuna
(74) *Attorney, Agent, or Firm*—Millipore Corporation (57) ABSTRACT

This invention provides a process for making microporous membranes from a polymer solution and the membranes therefrom. A thermal assist, such as heating of the polymer solution can be effected subsequent to shaping the solution, such as by forming a film, tube or hollow fiber of the solution under conditions that do not cause phase separation. In a preferred embodiment, the formed solution is briefly heated to generate a temperature gradient through the body of the formed solution. The polymer in solution then is precipitated to form a microporous structure. The formation of a wide variety of symmetric and asymmetric structures can be obtained using this process. Higher temperatures and/or longer heating times effected during the heating step result in larger pore sizes and different pore gradients in the final membrane product.

7 Claims, 4 Drawing Sheets

U.S. PATENT DOCUMENTS

| | | |
|---|---|---|
| 6,017,455 A | 1/2000 | Shimoda et al. |
| 6,042,783 A | 3/2000 | Nagamatsu et al. |
| 6,802,973 B2 | 10/2004 | Cheng et al. |
| 6,811,676 B2 | 11/2004 | Bradford et al. |
| 6,852,223 B2 | 2/2005 | Huang et al. |
| 6,884,375 B2 | 4/2005 | Wang et al. |
| 6,890,435 B2 | 5/2005 | Ji et al. |
| 6,890,436 B2 | 5/2005 | Komatsu et al. |
| 6,939,468 B2 | 9/2005 | Wang et al. |
| 7,560,025 B2 * | 7/2009 | Kools .................... 210/500.42 |

* cited by examiner

METHOD OF MANUFACTURING MEMBRANES AND THE RESULTING MEMBRANES

CROSS-REFERENCE RELATED APPLICATIONS

This application is a Divisional application of U.S. application Ser. No. 11/177,718 filed on Jul. 8, 2005, now U.S. Pat. No. 7,560,025 which is a Divisional application of U.S. application Ser. No. 10/275,129, filed on Oct. 31, 2002, now U.S. Pat. No. 6,994,811, Issued on Feb. 7, 2006, which is a National Phase Application of International Application No.: PCT/US01/16811, filed on May 22, 2001 which claims the benefit of U.S. Provisional Application No. 60/206,622, filed on May 24, 2000. The entire contents of the related application are incorporated in their entirety.

FIELD OF THE INVENTION

This invention relates to a process for making asymmetric microporous membranes having a controlled pore size and architecture and to the membranes so produced. More particularly, this invention relates to a process for making these microporous membranes from a polymer solution that is selectively heated under controlled conditions to induce a predetermined membrane architecture formed in a subsequent phase separation step.

BACKGROUND OF THE INVENTION

Microporous membranes based on semi-crystalline polymers have been previously prepared. Most of the commercial membranes of these polymers are symmetric in nature. The production of such microporous membranes are described, for example, in U.S. Pat. No. 4,208,848 for PVDF and in U.S. Pat. No. 4,340,479 for polyamide membranes. These preparations are generally described to consist of the following steps: a) preparation of a specific and well controlled polymer solution, b) casting the polymer solution onto a temporary substrate, c) immersing and coagulating the resulting film of the polymer solution in a nonsolvent, d) removing the temporary substrate and e) drying the resulting microporous membrane.

Polyvinylidene fluoride (PVDF) membranes as described above are made by casting a lacquer in a specific coagulant (e.g. acetone-water mixture, IPA-water mixture or methanol) that allows the formation of a microporous, symmetric membrane. A similar process is used for symmetric polyamide membranes. In these prior art processes, the semi-crystalline polymers used primarily lead to symmetric membranes. Membranes made from such semi-crystalline polymers have a characteristic property whereby the thermal history of the polymer solution prior to casting has a dramatic effect on membrane performance. In general terms, it has been found that the higher the maximum temperature to which the solution is heated to, the larger the rated pore size of the resulting microporous membrane. In one method of controlling pore size, the polymer solution is made at a relatively low temperature in a typical manufacturing stirred tank vessel, or similar, and then heated to the desired maximum temperature by, for example a heated jacket. Variability in lacquer history can therefore cause reduced process yields. It can be appreciated that fine control over the thermal history of a large mass of viscous solution is difficult. In-line heating and cooling treatment is sometimes used in order to provide improved control over the thermal history of the polymer solution being processed. An in-line process provides a means for heating the solution as it is transported through a pipeline, thereby reducing the effective mass of solution being heated. The shorter heating contact time necessitated by in-line heating requires good mixing to obtain even heat treatment. Membranes made from solutions having a uniform thermal history throughout its bulk tend to produce symmetric membranes.

Microporous membranes are described as symmetric or asymmetric. Symmetric membranes have a porous structure with a pore size distribution characterized by an average pore size that is substantially the same through the membrane. In asymmetric membranes, the average pore size varies through the membrane, in general, increasing in size from one surface to the other. Other types of asymmetry are known. For example, those in which the pore size goes through a minimum pore size at a position within the thickness of the membrane. Asymmetric membranes tend to have higher fluxes compared to symmetric membranes of the same rated pore size and thickness. Also, it is well known that asymmetric membranes can be used with the larger pore side facing the fluid stream being filtered, creating a prefiltration effect.

Practitioners have developed complex methods to produce asymmetric membranes from semi-crystalline polymers. PVDF membranes are produced by thermally induced phase separation (TIPS), where the temperature of an extruded film, tube or hollow fiber of a homogeneous polymer solution is quenched down to a lower temperature thereby inducing phase separation. Examples of PVDF membranes made by TIPS are disclosed in U.S. Pat. Nos. 4,666,607, 5,013,339 and 5,489,406. These processes require high temperatures and screw type extruders, increasing process complexity.

U.S. Pat. No. 4,629,563 to Wrasidlo discloses asymmetric membranes that can be characterized by a skinned layer that is relatively dense and thick with a gradually changing pore size beneath the skinned layer. Claimed ratios of pore sizes in opposite surfaces ranges from 10 to 20,000 times. This process requires the use of an "unstable liquid dispersion." Use of such dispersions reduces the control available over the overall process.

U.S. Pat. Nos. 4,933,081 and 5,834,107 disclose humid air exposure applied to PVDF-PVP solutions to create PVDF membranes to produce microporous membranes with high flux characteristics. By using similar humid-air exposure techniques as in U.S. Pat. No. 4,629,563, some subtle but apparently important differentiations are made from the Wrasidlo patent. These patents teach that differences in lacquer composition and humid air exposures can lead to large structural changes. In U.S. Pat. No. 4,933,081, membranes having hourglass porous structure are produced with the average diameters of the pores decreasing along a line from a microporous surface to a coarse pore surface. Thereafter, the pore size increases again along that same line. Both methods require additional control of the humid atmosphere-polymer solution contact time, humid air velocity, temperature and humidity, thereby increasing process complexity.

Furthermore, U.S. Pat. No. 5,834,107 describes structures having a gradual changing pore size from microporous side to a coarse surface. All the structures also have some large open volumes in portions of the membrane near the coarse surface of the membrane. This structure is defined in the patent as filamentous webs. The large open volumes, although they may be different in origin from macrovoids, can cause similar mechanical failures in membrane application and are therefore not desirable in applications where high integrity is required. The presence of these large open volumes is not beneficial in terms of retention, since the diameter of the flow paths are much too large to retain typical solutes or particles filtered by microporous membranes. In addition, the methods described above always use a high molecular weight additive in the lacquer and humid air exposure.

U.S. Pat. No. 6,013,688 discloses making PVDF membranes that appear to have an isotropic structure, containing a dense array of closely aligned and contiguous polymer particles. A part of the structure is characterized by so-called spherical craters. Such structures tend to be mechanically weak.

U.S. Pat. Nos. 5,626,805 and 5,514,461 disclose a complex thermally induced phase separation technique (TIPS) that quenches both sides of a film of a polymer solution with a different rate to effect different supersaturation in different time frames. The thermal quench technique can lead to asymmetric structures being characterized in cross section by a beady, open structure at one surface and a leafy, more tight structure at the other surface. However, to obtain an improvement in flux, it is not sufficient to have a larger pore size on both surfaces, but also that the pore size changes throughout the membrane.

U.S. Pat. No. 5,444,097 discloses heat induced phase separation for making high flow membranes. This method depends on generating phase separation by heating of a polymer solution to above its lower critical solution temperature (LCST). The LCST is a temperature at which a polymer solution becomes cloudy due to phase separation of the solution. A minimum on a curve of cloud point temperature as a function of polymer concentration is referred to the lower critical solution temperature. This technique is very specific for polymer solutions that are characterized by a lower critical solution temperature (LCST). In this process the polymer solution must be maintained at the desired temperature above the LCST. This increases the complexity of the process because the solvent laden solution must be transported from the heating region to the immersion region of the process while maintaining the desired temperature in a narrow temperature zone above or below the desired temperature so as not to change the final pore size from the designed pore size.

Accordingly, it would be desirable to provide a simple, easily controlled process for forming microporous membranes having asymmetric pore structure wherein the pore size throughout the membrane thickness varies.

SUMMARY OF THE INVENTION

This invention provides a process for making microporous membranes from a polymer solution. While it is well-known that the maximum temperature certain solutions of semi-crystalline polymers reach controls the pore size of the resulting membrane, it has been surprisingly found in this invention that by a brief thermal assist such as heating, much shorter in duration than taught in the prior art, of the formed polymer solution, so as to produce a temperature gradient through at least a portion of the thickness of the formed solution, produces a membrane having a controlled degree of asymmetry and pore size. Symmetric membranes having controlled pore size can be produced by a thermal assist such as heating the formed solution to a uniform temperature through the thickness of the formed solution.

A thermal assist is an application of heat across the thickness of a formed solution. A thermal assist can be accomplished by heating a surface of a formed solution or by a combination of heating one surface and previously, simultaneously or subsequently cooling the other side of the formed solution. Also by cooling one side and heating the other side, a thermal assist can be accomplished.

In the process, the polymer solution is thermally assisted under conditions that prevent phase separation. Thermal assisting of the polymer solution can be effected subsequent to shaping the solution, such as by forming a film, tube or hollow fiber of the solution. This invention will be described for convenience in terms of a film or sheet membranes, without being limited thereby. In a preferred embodiment, the formed solution is briefly thermally assisted to generate a temperature profile through the body of the formed solution. The polymer in solution then is precipitated to form a microporous structure such as by being immersed in a bath of nonsolvent for the polymer or by evaporation of solvent, either of these steps optionally in conjunction with contact with humid air before or during phase separation. Higher temperatures and/or longer times effected during the thermal assist step result in larger pore sizes and different profiles in the final membrane product.

In one preferred embodiment, the thermal assist step produces a temperature gradient in the formed polymer solution film that results in an asymmetric membrane being formed.

The preferred thermal assistance is by heating. Heating can also be done to produce a uniform temperature gradient through the body of the formed polymer solution film, so that a symmetric membrane can be formed in the subsequent phase separation step.

The length of time an element of volume in the body of a formed polymer solution film remains at the highest temperature also affects final structure. This invention therefore discloses control of total thermal assistance time and the thermal gradient formed in at least a portion of the formed polymer solution film.

The microporous product produced by the process of this invention can be skinned or unskinned and can be symmetric or asymmetric. The microporous structures produced by the process of the invention are free of macrovoids that are substantially larger than the average pore size of the membrane. The term "macrovoids" as used herein refers to voids in a membrane that are sufficiently large as not to function to produce a retentate. Additionally, the structures of the present invention are free of the filamentous webs of the prior art that also cause inefficient filtration.

Additionally, one is able to form composite structures of two or more layers wherein at least of the layers is formed by the thermal assist method of the present invention.

Furthermore, this thermal assist can be used to create symmetric membranes with variable pore size depending on the process condition.

DESCRIPTION OF SPECIFIC EMBODIMENTS

This invention comprises a process for making porous polymeric structures from formed polymer solutions wherein the thermal profile of the formed solution is controlled. The inventor has found that by producing a controlled temperature gradient in a formed solution of a semi-crystalline polymer prior to a phase separation step, one is able to produce porous structures having structural characteristics with controlled pore size gradients. It is essential to effect polymer precipitation subsequent to a thermal step and to avoid precipitation prior to and during the thermal step.

The process of this invention permits the formation of membranes having varying asymmetries. Asymmetry refers to the variation of average pore size in the thickness direction of a porous structure. For a sheet, asymmetry refers to the change in average pore size traversing the thickness from one side of the sheet to the opposite side. For a hollow fiber membrane, asymmetry refers to the change in average pore size traversing the thickness from the inner diameter to the outer diameter or vice versa. Asymmetry can be monotonic, that is, constantly increasing through the thickness. Asymmetry can also have an hourglass profile, in which the average pore size decreases to a minimum and then increases through the thickness. Another asymmetry resembles a funnel, having a symmetric portion adjoined to a monotonically increasing asymmetric portion.

The process of the present invention comprises,
Preparing a solution of one or more polymers,
Forming the solution into a shaped object,
Providing a thermal assist to the formed solution to produce a temperature profile in at least a portion of the thickness of the formed solution,
Producing a porous structure by a phase separation process step.

The polymer solution consists of at least one polymer and at least one solvent for the polymer or polymers. The solution may contain one or more components that are poor solvents or non-solvents for the polymer or polymers. Such components are sometimes called "porogens" in the art. The homogeneous solution can optionally contain one or more components, which are non-solvents for said polymer. The polymer solution can either be stable in time (good solvent quality) or be meta-stable in time. This solution also can potentially have a lower critical solution temperature or an upper critical solution temperature. Example components of such solutions are well known in the art, and it is not necessary to exhaustively list all possible variations. Examples of polymers useful in the present invention include but are not limited to polyvinyl chloride, polyvinylidene fluoride, blends of polyvinylidene fluoride such as with polyvinylpyrrolidone, polyvinylidene fluoride copolymers and various polyamides, such as the various nylons including Nylon 66. Solvents that are used included such examples as dimethyl formamide, N, N-dimethylacetamide, N-methyl pyrrolidone, tetramethylurea, acetone, dimethylsulfoxide. A myriad of porogens have been used in the art, including such examples as formamide, various alcohols and polyhydric compounds, water, various polyethylene glycols, and various salts, such as calcium chloride and lithium chloride.

The polymer solution is made by blending and mixing in a closed vessel, according to known methods, with the precaution that the temperature be controlled by cooling means to below the temperature to be applied in the thermal assisting step. The solution can be optionally filtered before the solution forming step.

The resulting homogeneous solution is formed into the desired shape by techniques such as casting, coating, spinning, extruding, etc., which are known in the art. Forming the solution is done to obtain the desired shape of the end product to be produced, which can be in any form such as block or a cylinder, a flat sheet, a hollow tube, solid or hollow fiber. For example, to produce a sheet, a knife coater, a slot coater or a LFC coater can be used as is described in "Microfiltration and Ultrafiltration Principles and Practice" Leos J. Zeman and Andrew L. Zydney; Marcel Dekker (1996). Hollow fibers can be formed using an annular extrusion die.

In the preferred mode, the formed solution is briefly heated to produce a temperature gradient in the thickness of the formed solution. For a sheet being carried on a support, such as a web, one side is briefly heated by contacting the carrier with a heated rod or other heated object. Heating is done in such a manner that the formed solution does not reach thermal equilibrium, but rather the unheated side does not reach the temperature of the heated side. In another mode, infrared heaters can be used to heat one side or the other in such a manner so as to obtain the desired temperature gradient. It can even be contemplated that combinations of heating methods can be used to obtain gradients from each surface to give a kind of "hourglass" asymmetry with a region of minimal pore size within the thickness of the resultant membrane. In another mode, if a symmetric structure is desired, the formed solution would be heated to thermal equilibrium, in which case no gradient would remain.

The temperature to which at least a portion of the formed polymer solution is heated and the time of heating depends upon the polymer and solvent/porogen system utilized to make the polymer solution and by the desired pore size of the membrane resulting from the process. The practitioner will have previously determined the relationship between the maximum temperature the solution sees and the final pore size of the resulting membrane. The minimum temperature to which at least one side of the formed solution can be heated is constrained to be at or above the maximum temperature that the solution attained in any previous process step. The practitioner will find that there is a temperature above which further heating has little effect on increasing pore size. Within these temperature ranges, the practitioner can vary pore size and asymmetry by control of the temperature to which at least one side of the formed solution is raised, and the time of the thermal contact.

Not only the temperature of the treatment, but the time at which the solution is at that temperature affect pore sizes. Longer times at any temperature result in a stronger effect, usually larger pores. Also the temperature gradient is reduced. Therefore, a surface of the film in contact with a heat source will have a temperature different than the opposite side positioned away from the heat source. A temperature gradient is effected through the film and the effect of the gradient on the pore size will depend on the relative steepness of the gradient, and the time each portion of the film thickness is at a certain temperature. Therefore, by controlling the heat source temperature, the time of heat application, formed polymer solution thickness and solution properties such as heat capacity and viscosity, the properties of membranes of this invention can be varied.

Generally the asymmetric membranes of this invention are characterized by a higher flux for a given pore size rating of the membrane. This is desirable to shorten filtration processing times during some membrane applications. Associated with this, some gradation in pore size can lead to higher capacities of microporous membranes for retaining filtered particles. By slightly changing the processing conditions, membranes of different asymmetries can be made with the same lacquer, having approximately the same pore size, but with different permeability characteristics. Thus, structures are provided having different asymmetries but with a similar pore size in a particular layer. The process of this invention is capable of providing microporous membranes having varying asymmetry independent of pore size. The microporous symmetric or asymmetric membranes of this invention have an average pore size typically in the range of 0.02 to 10 micrometers.

The inventive process described herein can be envisaged as making a wide variety of asymmetrical structures. If the thermal assistance is done to produce a uniform temperature gradient through the thickness of the formed solution, then the resulting membrane will have a more or less uniform gradient of pore sizes, with the largest pore sizes at the side to which the thermal assistance was applied. If the thermal assistance is done so that only a portion of the thickness if affected, then that portion will have an asymmetric structure, and the remainder will be of a symmetric nature. This is sometimes called a "funnel" structure. Another type of funnel structure may result if a portion of the thickness is subjected to the thermal assistance to an approximately uniform temperature and the remainder of the thickness attains a temperature gradient. In this case, the adjacent thickness portion to the side to which heating was applied will be symmetric and the remainder of the membrane will be asymmetric. If both sides of the formed solution were subjected to the thermal assistance so that two gradients extending from each surface were attained, then one could expect that both sides would have larger pore sizes than a region in the interior of the thickness. By varying the relative temperatures of the sides, a variety of structures would be possible. Microporous membranes of this invention have no large macrovoids or filamentous web structures. It can therefore be seen that in the hands of one of ordinary skill in the art, many possible structures can be formed, not all of which are needed to be exhaustively presented to illustrate the utility of the present invention.

Figure 1:
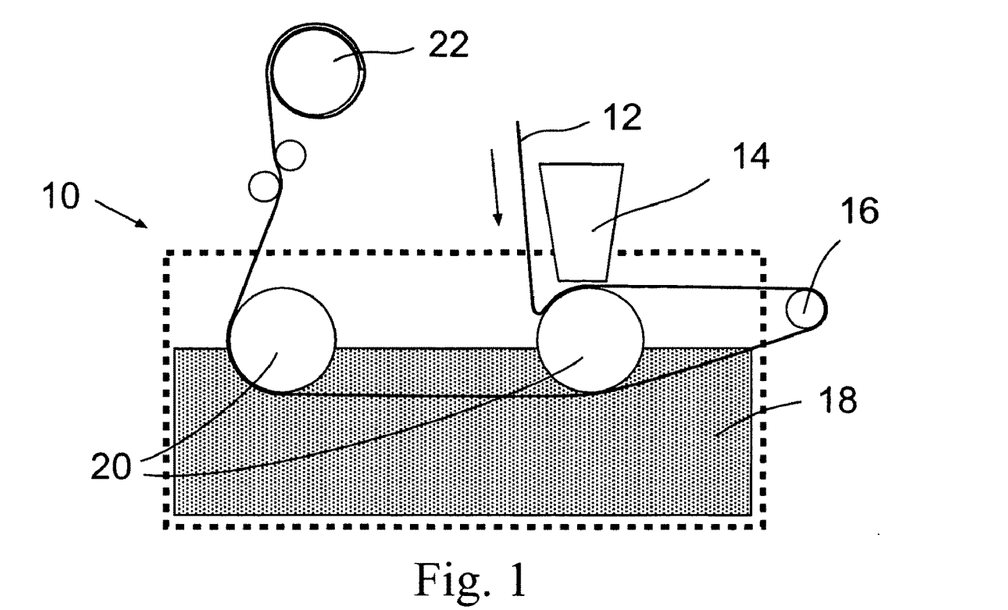
FIG. 1 is a side view of an apparatus useful in effecting the process of this invention.

Referring to FIG. 1, an apparatus 10 useful for effecting an embodiment of the process of this invention comprises a moving belt 12 which contacts an outlet of a knife box 14 from which a polymeric solution is dispensed onto the belt 12. The belt 12 supporting a film of the polymer solution is passed over heated pipe 16 to effect briefly heating of the polymer solution film. The belt 14 and heated polymeric film are then immersed in a coagulant bath 18 for sufficient time to effect phase separation of the polymer solution and to form a microporous polymeric membrane. The belt 14 is carried over one or more rollers 20 in the bath 18. The belt 14 supporting the microporous membrane then is wound onto wind up drum 22.

As described above different arrangements could be made to carry out other embodiments of the present invention. For example, one could use an alternative heat source such as infrared heaters. Alternatively, the thermal source can be located on the side of the solution opposite of the belt 14. In another embodiment a series of thermal sources can be used to prolong the thermal assistance transfer. Alternatively, one can apply a positive cooling to the side of the solution opposite the heat source to create a greater gradient in the structure. One can also apply two thermal sources, one to each side. They may be of the same temperature or different, applied simultaneously or sequentially and they can be applied for the same or different duration depending upon the structure one wishes to make.

If desired, one can form composite membranes, i.e. membranes formed of two or more layers of membranes, in which one or more of the layers of the composite membrane have been formed by the method of this invention. Typically a first support layer is formed such as another microporous structure, which may be microporous structure often present invention or any other microporous structure or it may be a non-woven or woven sheet, such as TYPAR® or TYVEK® sheet materials available from E.I. DuPont de Nemours of Wilmington, Del. or glass fiber or plastic fiber mats. The second layer is cast on to this preformed layer to form the composite structure. One embodiment of such a structure would be form a symmetrical membrane on top of an asymmetrical membrane of the present invention. The symmetrical membrane may be formed according to the present invention (which is preferred) or it may be formed by any other known process. Alternatively, one can form a first asymmetrical membrane according to the present invention of a specific porosity and asymmetry and then a form a second layer of the same or preferably, different asymmetry and pore size. Likewise if desired composite structures of two or more symmetrical structures can also be formed.

Additionally, it has been found that the percentage of pore space on the tight side of an asymmetrical membrane (the side having the smaller pores) is significantly greater than that which can be achieved with any of the prior art. Typically, the methods of the prior art resulted in a surface that was "skinned". By skinned, it was meant that the amount of open pore space on the surface is relatively small as compared to the entire surface area. When view via a scanning electron microscope, one sees a surface having small open pores extending into the structure and these pores are surrounded by large areas of solid polymer structure. The surface is unlike that obtained with a symmetric microporous structure, where the surface is as open as the cross-sectional thickness. For example, the methods of the prior art discussed above have produced asymmetric membranes having a tight pore surface, typically having an open pore space % of from about 1 to about 5% of the entire surface area. Few of the prior art methods may be capable of producing tight surfaces with a 5-10% pore space. This is unacceptable as it limits flow and reduces the flux that is capable of being achieved in the membrane.

It has been discovered that the present invention is capable of producing asymmetric membranes with significantly higher percentages of tight side porosity than is achieved with the prior art. Asymmetric membranes of the present invention are capable of open pore space percentages of greater than 10%, typically from about 10 to about 20% and in some instances even greater than about 20%. This allows of greater flow and flux to be achieved than is possible with the membranes of the prior art.

The following examples illustrate the present invention and are not intended to limit the same. A practitioner of ordinary skill in the art of developing and producing porous polymer structures, particularly porous membranes, will be able to discern the advantages of the present invention. It is not the intent of the discussion of the present invention to exhaustively present all combinations, substitutions or modifications that are possible, but to present representative methods for the edification of the skilled practitioner. Representative examples have been given to demonstrate reduction to practice and are not to be taken as limiting the scope of the present invention. The inventor seeks to cover the broadest aspects of the invention in the broadest manner known at the time the claims were made.

Example I

The initial experiment showed that by a short exposure of a cast film, before phase separation but after formation, to heat, the bubble point of a membrane can be changed drastically.

A 20 w % PVDF solution is made with N-methylpyrrolidone. This film is cast on a polyester sheet and subsequently placed on a hot stage for different times. This heat treated film is then immersed into a methanol bath for 2 minutes and washed with water. Finally the membranes are air dried under restraint.

TABLE 1

| Treatment time | Temperature (Centigrade) | IPA peak bubble point (psi) |
|---|---|---|
| 10 sec | 50 | 12 |
| 30 sec | 50 | 20 |
| 2 × 2 sec | 50 | 10 |
| 0 (no heat treatment) | — | 54-50 psi |

Surprisingly, the bubble point of the membranes was clearly changed in a relatively small time frame, see Table 1.

Example II

By using the thermal assisted casting process, membranes with improved fluxes can be made if the exposure time is limited. To obtain better reproducible results, a heated rod was installed on a continuous casting machine. The support belt was conveyed over this rod during casting. An air gap between the heating rod and the coagulation bath was placed to allow the film to cool down to reduce flammability issues in this particular case.

A 20 w % PVDF solution was made in N-methylpyrrolidone at room temperature. A thin film of polymer solution was cast continuously onto a polyester belt. This cast film was exposed for various times to a heated rod at a controlled temperature. Table 2 displays the time and temperatures of the heat exposure. This heat treated film was quenched into methanol at room temperature and extracted in water, then air dried under restraint.

TABLE 2

| Temperature (Centigrade) | Exposure time (seconds) | Bubble Point | Thickness corrected air flux (scfm/psi * um) |
|---|---|---|---|
| 45 | 1 | 24 | 8.5 |
| 45 | 2 | 24 | 9 |
| 45 | 3 | 24 | 9.8 |
| 47.5 | 1 | 24 | 8.3 |
| 47.5 | 2 | 20 | 11.2 |
| 47.5 | 3 | 20 | 11.3 |
| 50 | 2 | 14 | 6 |
| Durapore ® 0.45 | — | 15 | 5.5 |
| Durapore ® 0.22 | — | 27 | 3.5 |

Thickness corrected air flux (air flux times thickness) for similar bubble points for asymmetric membranes made by the present process was observed to be twice as much as for symmetric, commercially available membranes known as DURAPORE® membranes available from Millipore Corporation of Bedford, Mass. These thickness corrected flux increases are similar if not higher as the membranes formed by humid air exposure of U.S. Pat. No. 5,834,107. However, no large voids are formed to achieve this flux increase, indicative of a larger asymmetry within the membrane.

Figure 2:
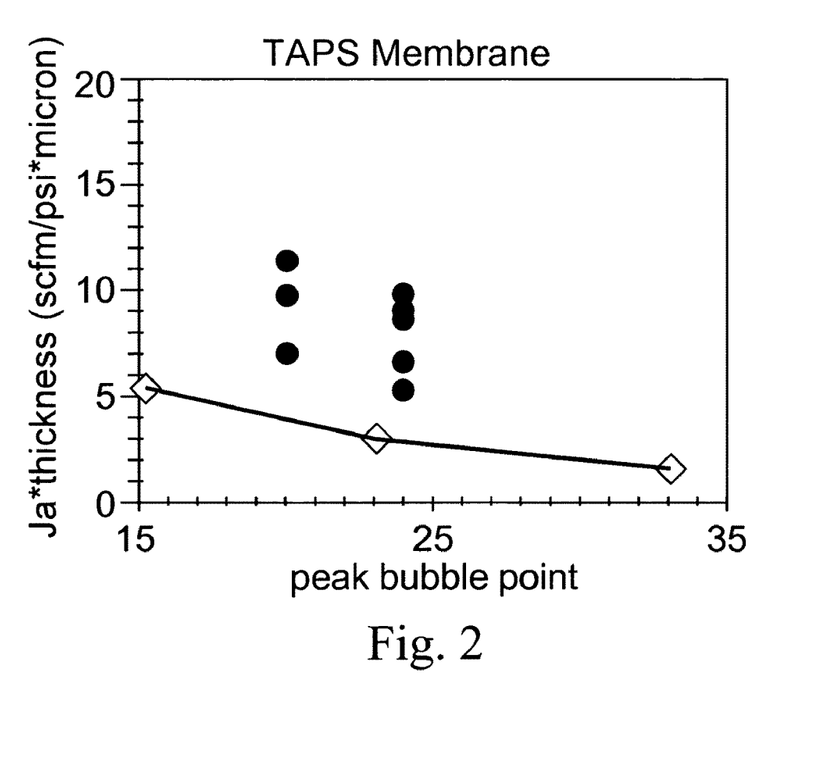
FIG. 2 is a graph of bubble point of the membranes of this invention as a function of air flux.

It is clear from Table 2 and FIG. 2 that is a graphical representation of the data that the membranes formed by this process can exhibit a higher flux compared to symmetric membranes.

Example III

Asymmetry in PVDF Membranes

SEM Confirmation

Figure 3:
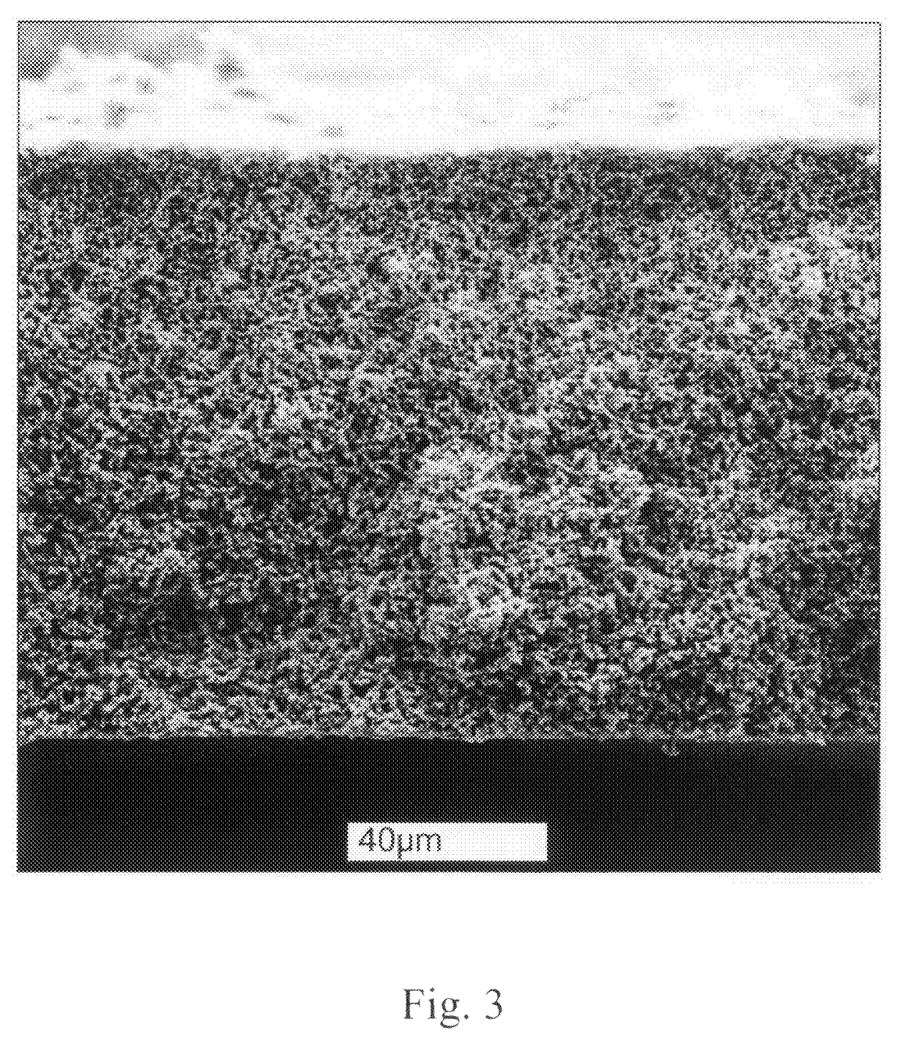
FIG. 3 is a photomicrograph of a cross-section of an asymmetric microporous membrane of this invention.
Figure 4:
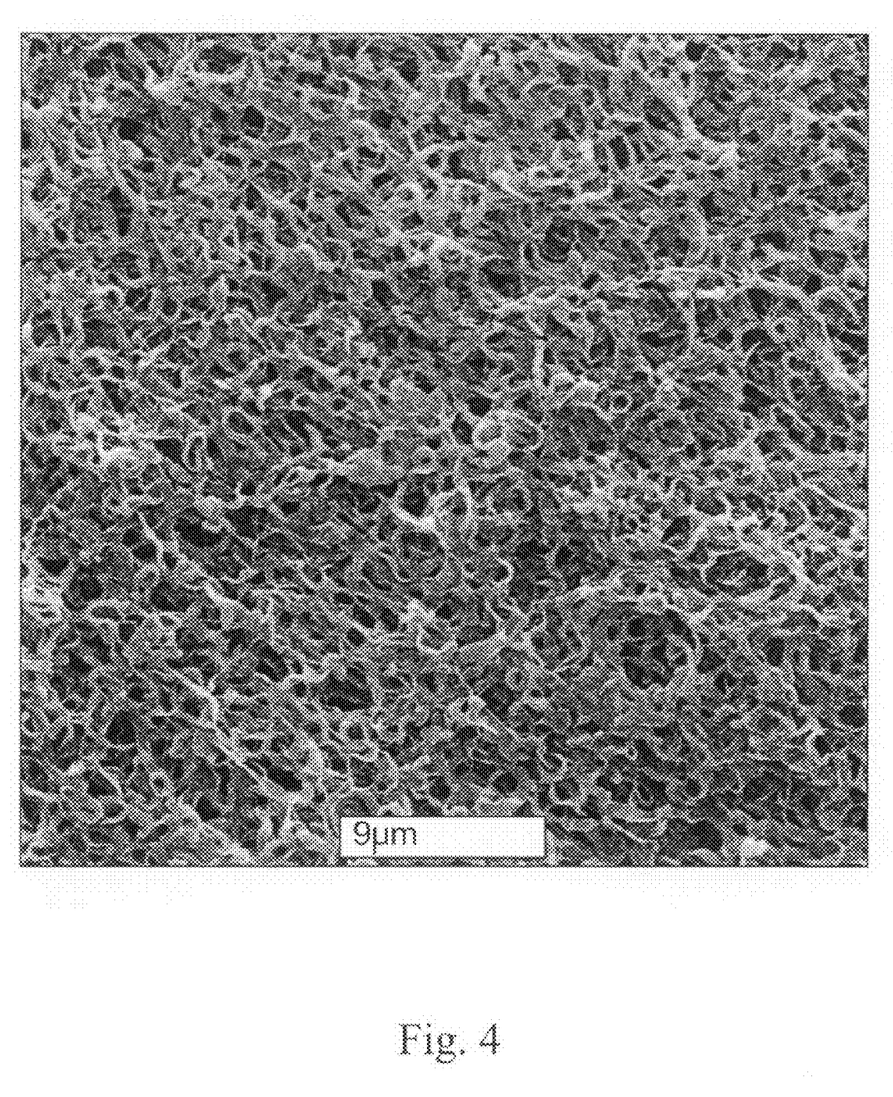
FIG. 4 is a photomicrograph of the top surface of the membrane of FIG. 3.
Figure 5:
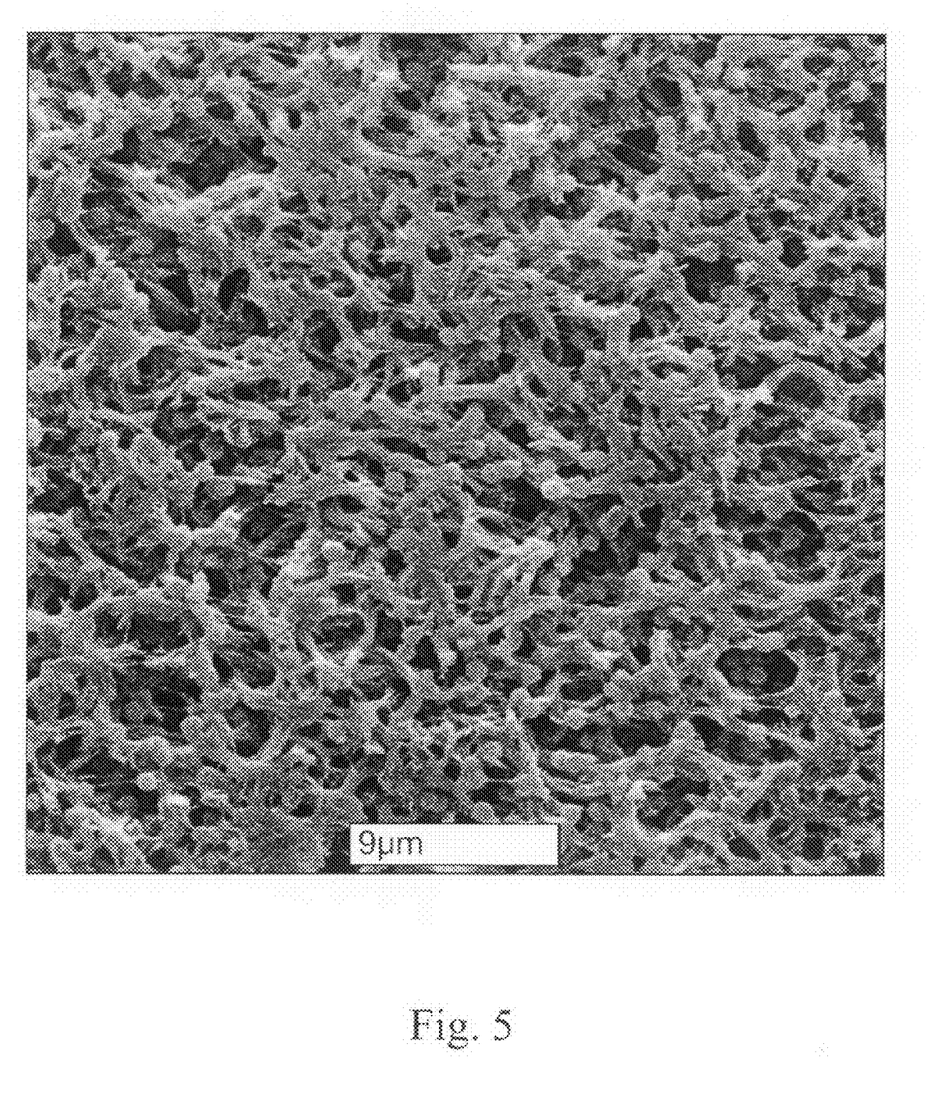
FIG. 5 is a photomicrograph of the bottom surface of the membrane of FIG. 3.

A PVDF solution was made of 20 w % PVDF in NMP. Membranes were machine cast by exposing a cast film (6 mil gap) to a heated rod for 2 seconds. Two different types of structures were formed using the same lacquer and coagulation procedure: a symmetric, unskinned PVDF membrane with low bubble point (high temperatures) and an asymmetric membrane (at intermediate temperatures). An image of such an asymmetric structure of the present invention is shown in cross section in FIG. 3. FIG. 4 shows the top surface of the membrane of FIG. 3 and FIG. 5 shows the bottom surface of the membrane of FIG. 3.

TABLE 3

| Temperature (C.) | Peak Bubble Point (psi) |
|---|---|
| 43 | 77 |
| 46 | 13 |

Unlike what is usually seen with basically symmetric membranes, the bath side of the membrane has a more tight and irregular structure compared to the belt side.

In all of the examples no macrovoids or filamentous webs were formed, thereby providing a more efficient and effective filter than those formed by the processes of the prior art.

What is claimed:

1. A microporous polymeric structure having a pore size from about 0.02 to about 10 micrometers comprising an asymmetrical gradient in porosity from a first major surface to a second major surface; wherein the first and second major surfaces are skinless, wherein the structure is substantially free of macrovoids and filamentous webs and has a surface porosity on a tight side of greater than 10%, and wherein the polymeric structure is formed from a material selected from the group consisting of polyamides.

2. The structure of claim 1 wherein at least the first major surface has the tight side.

3. The structure of claim 1 wherein at least the first major surface has a porosity of from about greater than 10% to about 20%.

4. The structure of claim 1 wherein the polymeric structure is formed of Nylon 66.

5. A microporous polymeric structure having a pore size from about 0.02 to about 10 micrometers comprising an asymmetrical gradient in porosity from a first major surface to a second major surface, wherein the first and second major surfaces are skinless, wherein the structure is substantially free of macrovoids and filamentous webs and has a surface porosity on a tight side of greater than 10%, and wherein the polymeric structure is formed from Nylon 66.

6. A microporous polymeric structure having a pore size from about 0.02 to about 10 micrometers comprising an asymmetrical gradient in porosity from a first major surface to a second major surface, wherein the first and second major surfaces are skinless, wherein the structure is substantially free of macrovoids and filamentous webs, the first major surface has the tight sides and the tight side has a surface porosity of from about greater than 10% to about 20% and wherein the polymeric structure is formed from a material selected from the group consisting of polyamides.

7. The structure of claim 6 wherein the polymeric structure is formed of Nylon 66.

* * * * *